(12) United States Patent
Yang et al.

(10) Patent No.: US 8,338,015 B2
(45) Date of Patent: Dec. 25, 2012

(54) BATTERY COVER LATCHING ASSEMBLY

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 670 days.

(21) Appl. No.: 12/563,249

(22) Filed: Sep. 21, 2009

(65) Prior Publication Data

US 2010/0136401 A1    Jun. 3, 2010

(30) Foreign Application Priority Data

Dec. 1, 2008    (CN) .......................... 2008 1 0305883

(51) Int. Cl.
  *H01M 2/10*    (2006.01)
  *H05K 5/00*    (2006.01)
(52) U.S. Cl. ..................... 429/97; 429/100; 361/679.56; 361/747

(58) Field of Classification Search .................... 429/96, 429/97, 100; 361/600, 679.01, 679.56, 747
See application file for complete search history.

(56) References Cited

U.S. PATENT DOCUMENTS

| 2006/0154136 A1* | 7/2006 | Ge et al. ........................... 429/97 |
| 2007/0015477 A1* | 1/2007 | Tu et al. ......................... 455/128 |
| 2007/0117598 A1* | 5/2007 | Yang et al. ................. 455/575.1 |

* cited by examiner

*Primary Examiner* — Basia Ridley
*Assistant Examiner* — Jonathan G Leong
(74) *Attorney, Agent, or Firm* — Altis Law Group, Inc.

(57) ABSTRACT

A battery cover latching assembly comprises a battery housing member, a battery cover and a plurality of latching members. The battery cover is mounted to the battery housing and has a first surface facing the battery housing member. The battery cover has a plurality of latching portions protruding from the first surface. The latching members are mounted to the battery housing member respectively corresponding to the latching portions of the battery cover. Each latching member has a plurality of hooks corresponding to the latching portions, the hooks are latched with the latching portions.

18 Claims, 4 Drawing Sheets

BATTERY COVER LATCHING ASSEMBLY

BACKGROUND

1. Technical Field

The exemplary disclosure generally relates to battery cover latching assemblies, particularly to a battery cover latching assemblies used in portable electronic devices.

2. Description of Related Art

As a power source, batteries are widely used in portable electronic devices, such as personal digital assistants (PDAs), cellular phones, etc. Conventional batteries are typically received in the electronic devices, and battery covers are designed to engage with housings of the electronic devices to package the batteries. When replacing the battery, the battery cover needs to be disengaged from the housing However, during disassembly, the battery cover is susceptible to being damaged, since large forces are exerted thereon. As a result, it is often inconvenient for a user to change a battery in the housing of the portable electronic device.

Therefore, there is a room for improved in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary battery cover latching assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
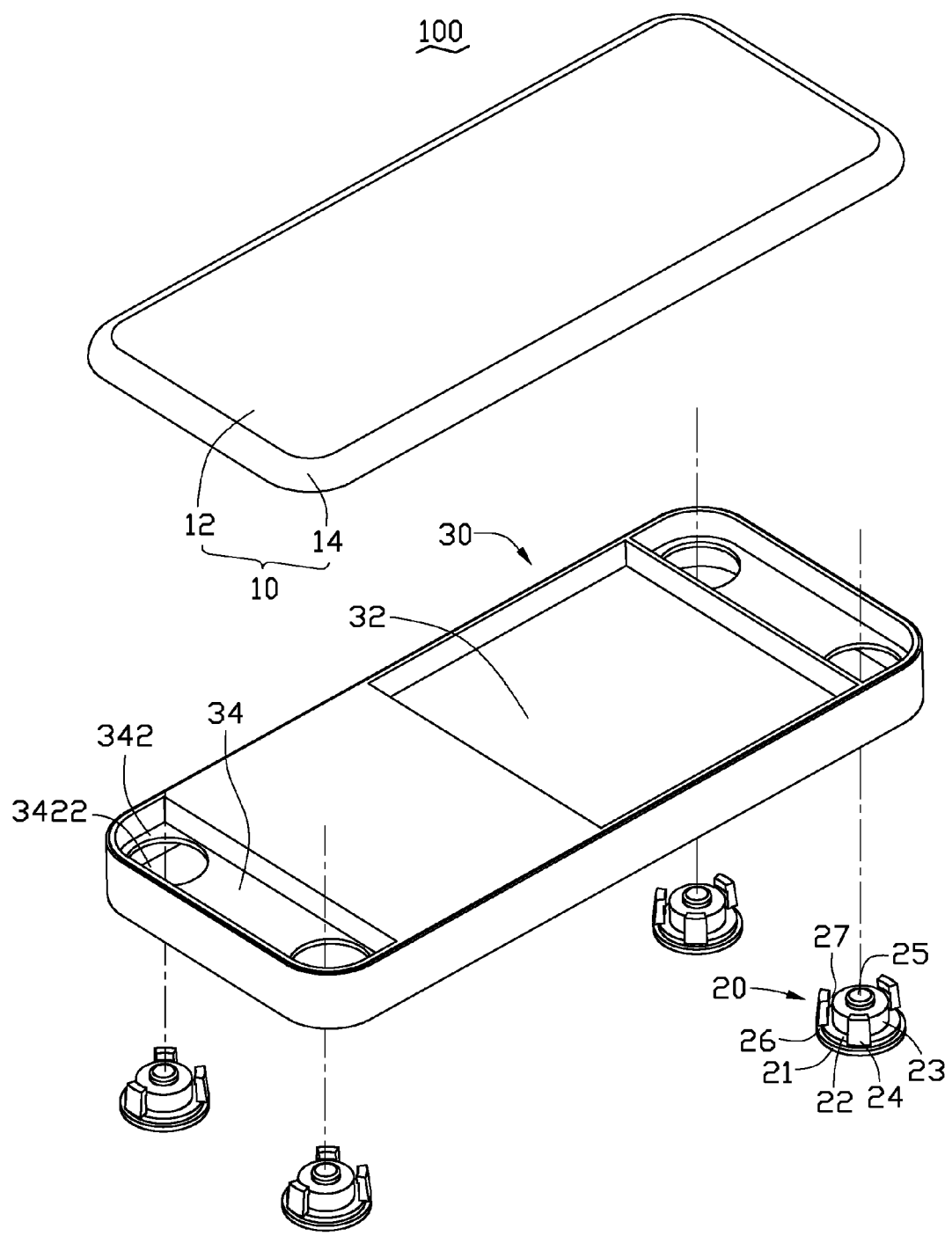
FIG. 1 is an exploded view of an exemplary embodiment of a battery cover latching assembly including a battery housing member, a battery cover and a plurality of latching member.
Figure 2:
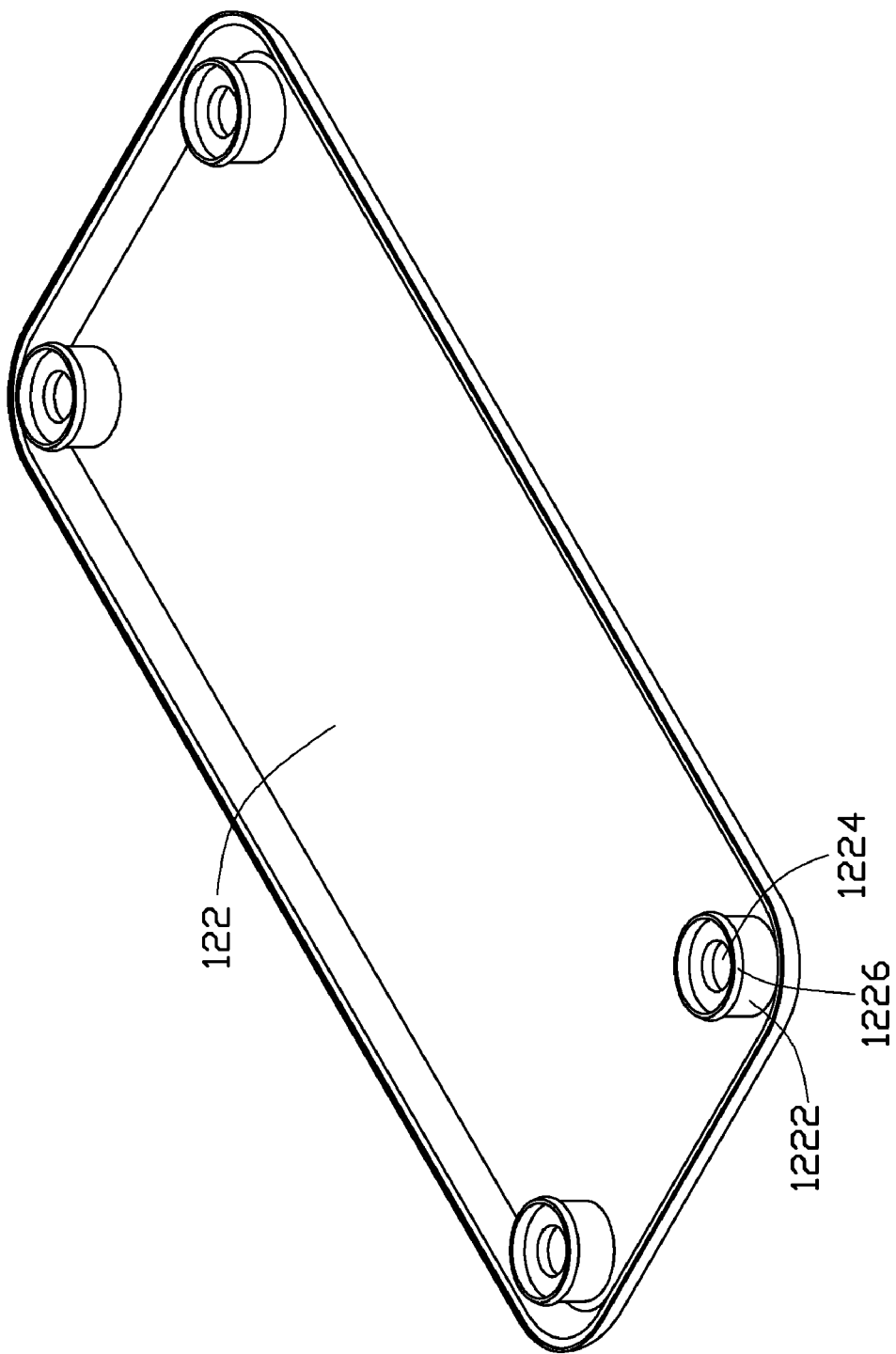
FIG. 2 is similar to FIG. 1, but showing the battery cover latching assembly in another aspect.

Referring to FIGS. 1 and 2, an exemplary battery cover latching assembly 100 used in a portable electronic device for accommodating a battery is shown. The battery cover latching assembly 100 includes a battery cover 10, a plurality of latching members 20 and a battery housing member 30. The latching members 20 are mounted to the battery housing member 30, the battery cover 10 is latched with the latching members 20 so the battery cover 10 is latched with the battery housing member 30.

Figure 4:
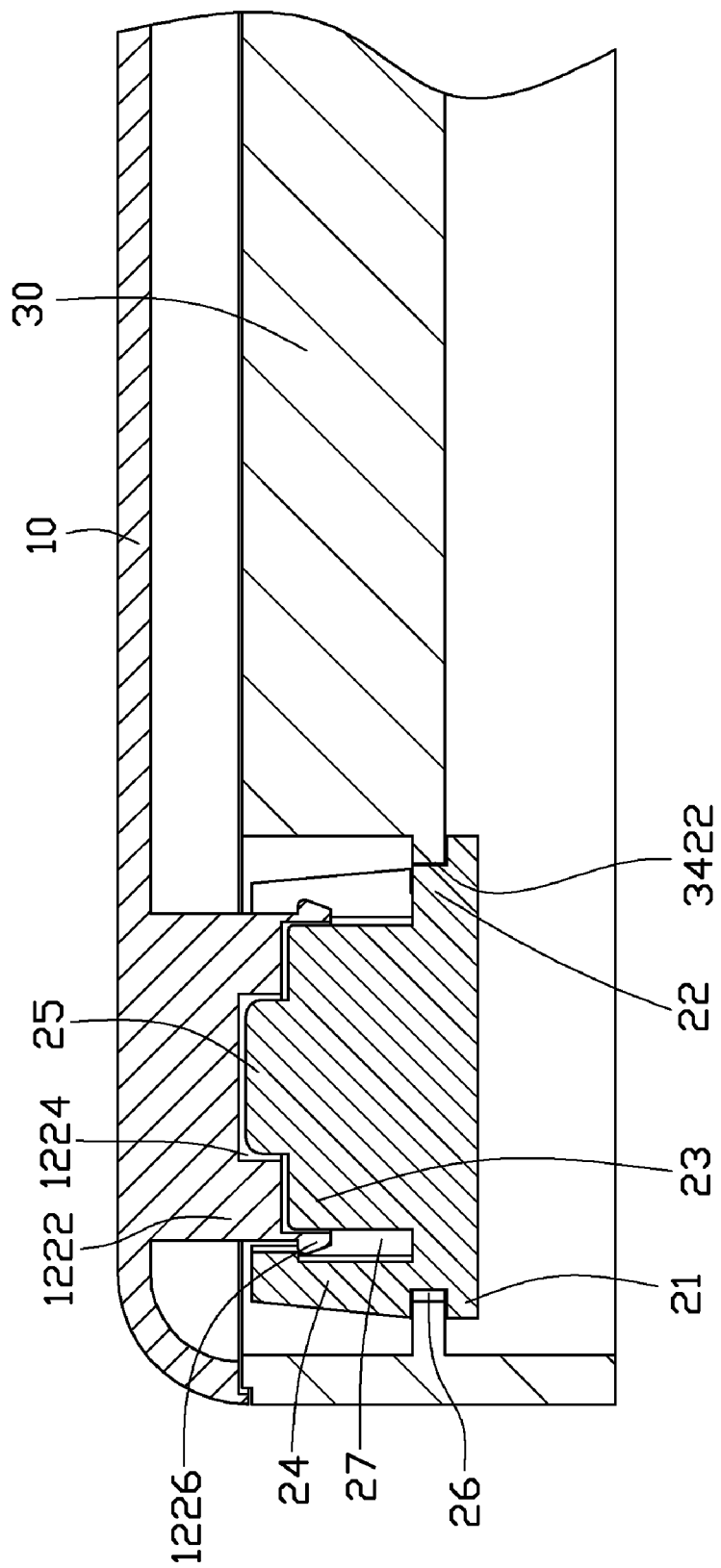
FIG. 4 is a partially enlarged and cross-sectional view of the battery cover latching assembly shown in FIG. 3.

The battery cover 10 includes a bottom wall 12 and a peripheral wall 14 extending from a peripheral edge of the bottom wall 12. The bottom wall 12 includes a first surface 122 facing the battery housing member 30. The battery cover 10 has cylinders 1222 respectively protruding from one or more corners of the first surface 122. Each cylinder 1222 has a positioning hole 1224 defined in an end surface thereof and an annular latching portion 1226 protruding from the end surface thereof surrounding the positioning hole 1224. Referring to FIG. 4, the cross-section of the latching portion 1226 is L-shaped, the latching portions 1226 are configured to respectively latch with the latching members 20.

Each latching member 20 includes a cylindrical base plate 21, a cylindrical connecting portion 22 protruding from an end surface of the base plate 21, a cylindrical securing portion 23 protruding from an end surface of the connecting portion 22, a plurality of hooks 24 protruding from the end surface of the connecting portion 22 surrounding the securing portion 23, and a cylindrical positioning portion 25 protruding from an end surface of the securing portion 23. The diameter of the base plate 21 is larger than that of the connecting portion 22, and the hooks 24 partially protrude upwardly from a peripheral surface of the connecting portion 22, so a plurality of securing grooves 26 are formed between the base plate 21 and the hooks 24. The securing grooves 26 are configured to latch with the battery housing member 30. The hooks 24 are spaced from the securing portion 23, so a plurality of securing spaces 27 are defined between the hooks 24 and the securing portion 23. The securing spaces 27 are configured to firmly accommodate the latching portions 1226 of the battery cover 10, and the hooks 24 are latched with the latching portions 1226 when the latching portions 1226 are accommodated in the securing spaces 27. The positioning portions 25 have the same shape and size as the positioning holes 1224 and are accommodated in the positioning holes 1224, correspondingly. Additionally, an outer surface of each hook 24 is wedged so that the latching members 20 can easily latch to the battery housing member 30. The rationale of the wedged outer surfaces of the hooks 24 will be described hereinafter.

The battery housing member 30 has a compartment 32 defined in one side thereof. The compartment 32 is configured to accommodate the battery therein. The battery housing member 30 has two recesses 34 respectively defined at two sides of the compartment 32. Each of the recesses 34 has a bottom surfaces 342. Each bottom surface 342 has two openings 3422 defined therethrough corresponding to the latching members 20. The openings 3422 have the same shape and size as the connecting portions 22 of the latching members 20, and the thickness of the bottom surfaces 342 is equal to the thickness of the securing grooves 26.

Figure 3:
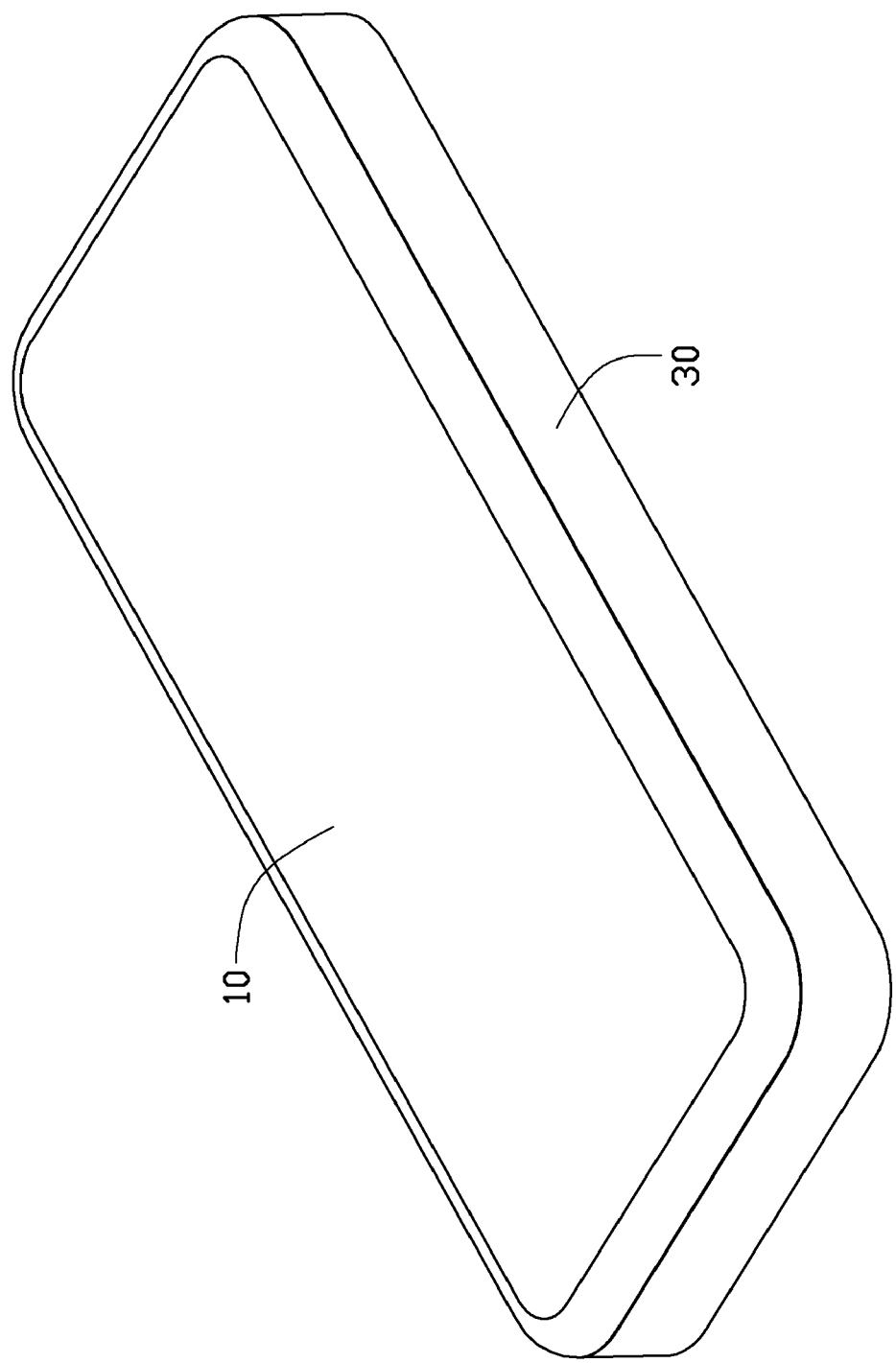
FIG. 3 is an assembled view of the battery cover latching assembly shown in FIG. 1.

Referring to FIGS. 3 and 4, during assembling the battery cover latching assembly 100, firstly, the latching members 20 are aligned with the openings 3422, and the hooks 24 face to the battery housing member 30. Secondly, the latching members 20 are upwardly pushed into the openings 3422. As said above, the outer surfaces of the hooks 24 are wedged and the hooks 24 are spaced from the securing portions 23, so the hooks 24 are biased toward the securing portions 23 to facilitate the hooks 24 passing through the openings 3422. Once the hooks 24 pass through the openings 3422, the securing grooves 26 of the latching members 20 are latched with the bottom surfaces 3422. Moreover, the thickness of the securing grooves 26 is equal to the thickness of the bottom surfaces 3422, and the openings 3422 have the same shape and size as the connecting portions 22 of the latching members 20, so the connecting portions 22 are securely accommodated in the openings 3422 and the securing grooves 26 are firmly latched with the bottom surfaces 3422. Thus, the latching members 20 are firmly secured to the battery housing member 30.

After that, the latching portions 1226 of the battery cover 10 are aligned with the latching members 20 on the battery housing member 30. Then, the battery cover 10 is pressed toward the battery housing member 30, so the latching portions 1226 outwardly bias the hooks 24 until the latching portions 1226 enter into the securing spaces 27 of the latching members 20. At this time, the latching portions 1226 are latched with the hooks 24, and two sides of the latching portions 1226 are limited by the hooks 24 and the securing portions 23, and the positioning portions 25 of the latching members 20 are accommodated in the positioning holes 1224. Thus, the battery cover 10 is firmly secured to the battery housing member 30.

When detaching the battery cover 10 from the battery housing member 30, the battery cover 10 is pushed away from the battery housing member 30, so the latching portions 1226 bias the hooks 24 expanding outwardly until the latching portions 1226 are slid outwardly from the securing spaces 27. Thus, the battery cover 10 is releasably detached from the battery housing member 30.

It is to be understood, the base plates 21, the connecting portions 22, the securing portions 23 and the positioning portions 25 may be other shape, such as rectangular.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching assembly, comprising:
a battery housing member;
a battery cover, the battery cover being mounted to the battery housing and having a first surface facing the battery housing member, the battery cover having a plurality of latching portions protruding from the first surface; and
a plurality of latching members, the latching members being mounted to the battery housing member respectively corresponding to the latching portions of the battery cover, each latching member comprising a base plate, a connecting portion protruding from an end surface of the base plate, a plurality of hooks protruding outwardly from an end surface of the connecting portion, and a plurality of securing grooves formed between the base plate and the hooks, the hooks being latched with the latching portions, the securing grooves being latched with the battery housing member;
wherein the battery housing member comprises a bottom surface, and a plurality of openings defined through the bottom surface corresponding to the latching portions, the connecting portions are respectively accommodated in the openings.

2. The battery cover latching assembly as claimed in claim 1, wherein the thickness of the bottom surface is equal to the thickness of the securing grooves, the securing grooves are latched with bottom surface.

3. The battery cover latching assembly as claimed in claim 1, wherein each connecting portion has a securing portion protruding an end surface thereof, the securing portion are spaced from the hooks, so that the securing grooves are formed between the hooks and the securing portion, the securing grooves are configured to securely accommodate the latching portions therein.

4. The battery cover latching assembly as claimed in claim 3, wherein each hook has an outer surface facing away from the securing portion, the outer surfaces of the hooks are wedged to facilitate the connecting portions accommodating in the openings.

5. The battery cover latching assembly as claimed in claim 1, wherein the number of the latching portions is four, the latching portions are respectively protruding from four corners of the battery cover.

6. The battery cover latching assembly as claimed in claim 5, wherein the battery cover further includes four cylinders protruding from the first surface, the latching portions are hollow annular respectively protruding an end surface of the cylinders.

7. The battery cover latching assembly as claimed in claim 6, wherein each cylinder further has a positioning hole defined the end surface thereof, each securing portions has a positioning portion protruding from an end surface thereof, the positioning portions are accommodated in the positioning holes.

8. A battery cover latching assembly, comprising:
a battery housing member;
a battery cover, the battery cover mounted to the battery housing and having a first surface facing the battery housing member, the battery cover having a plurality of annular latching portions protruding from the first surface; and
a plurality of latching members, the latching members mounted to the battery housing member respectively corresponding to the latching portions of the battery cover, each latching member has a plurality of hooks, the hooks surroundingly latched with corresponding latching portions.

9. The battery cover latching assembly as claimed in claim 8, wherein each latching member includes a base plate and a connecting portion protruding from an end surface of the base plate, the hooks protrude from an end surface of the connecting portion.

10. The battery cover latching assembly as claimed in claim 9, wherein each latching member has a plurality of securing grooves formed between the base plate and the hooks, the securing grooves are latched with the battery housing member.

11. The battery cover latching assembly as claimed in claim 10, wherein the battery housing member includes a bottom surface, the battery housing member has a plurality of openings defined through the bottom surface corresponding to the latching portions, the connecting portions are respectively accommodated in the openings.

12. The battery cover latching assembly as claimed in claim 11, wherein the thickness of the bottom surface is equal to the thickness of the securing grooves, the securing grooves are latched with bottom surface.

13. The battery cover latching assembly as claimed in claim 11, wherein each connecting portion has a securing portion protruding an end surface thereof, the securing portions are spaced from the hooks, so that a plurality of securing grooves are formed between the hooks and the securing portions, the securing grooves are configured to securely accommodate the latching portions therein.

14. The battery cover latching assembly as claimed in claim 13, wherein each hook has an outer surface facing away from the securing portion, the outer surfaces of the hooks are wedged to facilitate the connecting portions accommodating in the openings.

15. The battery cover latching assembly as claimed in claim 8, wherein the number of the latching portions is four, the latching portions are respectively protruding from four corners of the battery cover.

16. The battery cover latching assembly as claimed in claim 5, wherein the battery cover further includes four cylinders protruding from the first surface, the latching portions respectively protrude an end surface of the cylinders.

17. The battery cover latching assembly as claimed in claim 16, wherein each cylinder further has a positioning hole defined the end surface thereof, each securing portions has a positioning portion protruding from an end surface thereof, the positioning portions are accommodated in the positioning holes.

18. A battery cover latching assembly, comprising:
a battery housing member;
a battery cover mounted to the battery housing, the battery cover having a first surface facing the battery housing member, and a plurality of annular latching portions protruding from the first surface; and
a plurality of latching members being mounted to the battery housing member respectively corresponding to the latching portions of the battery cover, each latching member comprising a base plate, a securing portion protruding from the base plate, and a plurality of hooks protruding from the base plate surrounding the securing portion, the hooks being spaced from the securing portion;
wherein each latching portion is latched with the hooks of each latching member, and two sides of each latching portion are respectively limited by the hooks and the securing portion.

* * * * *